(No Model.)  2 Sheets—Sheet 1.
H. HILDENBRAND.
COLLAR STUFFING MACHINE.
No. 503,479. Patented Aug. 15, 1893.
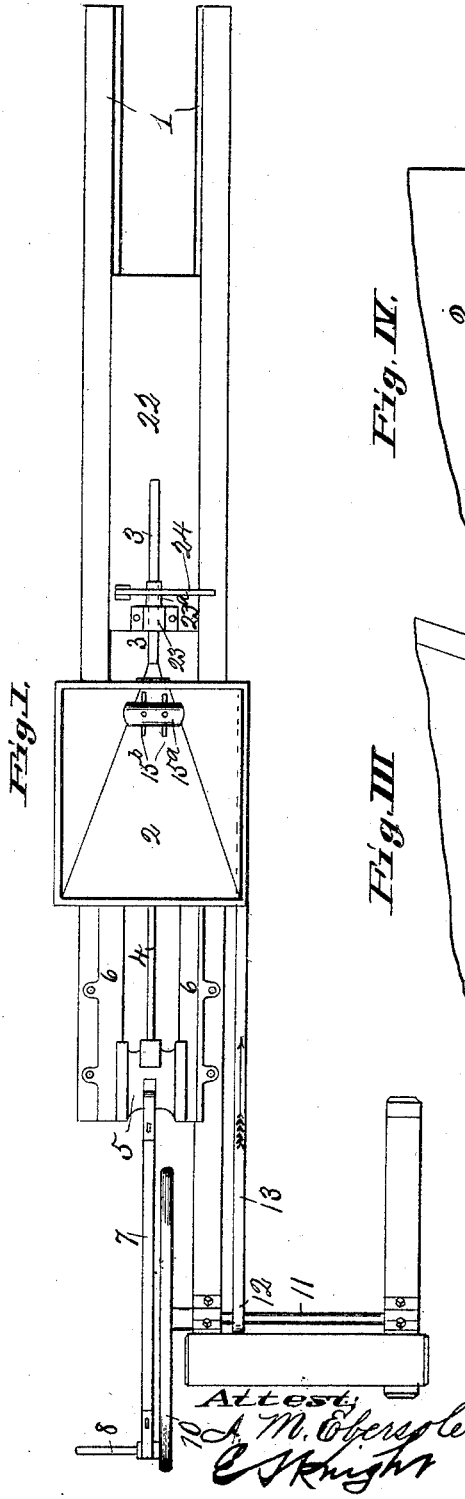
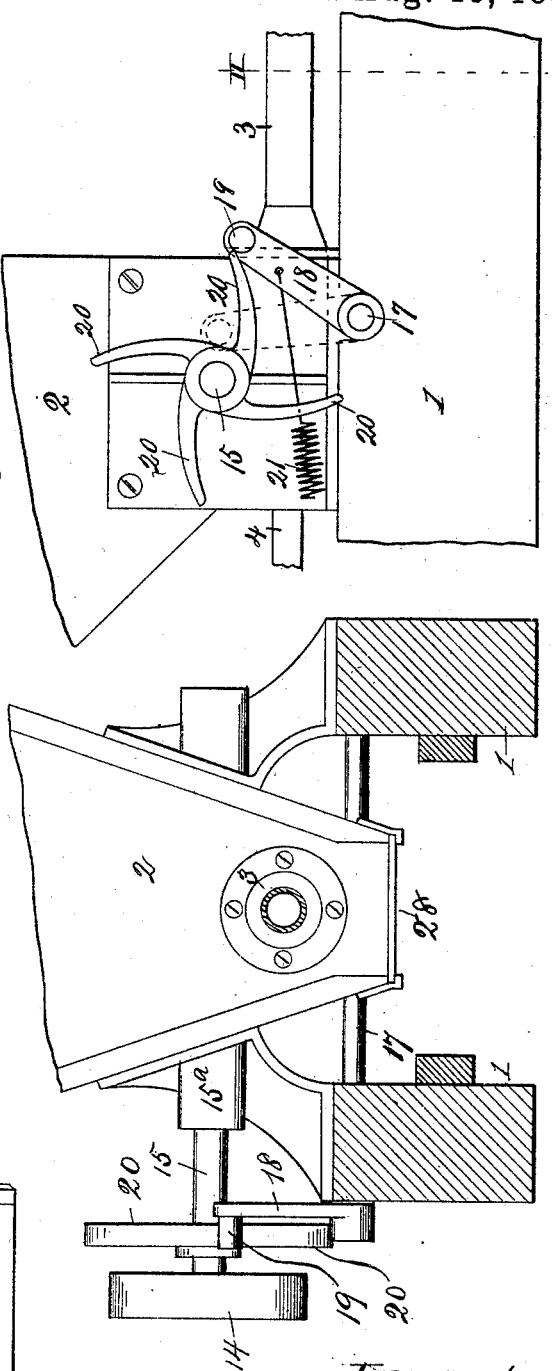
Attest:
A. M. Ebersole
C. J. Knight
Inventor:
Henry Hildenbrand
By Knight Bro's
Att'ys

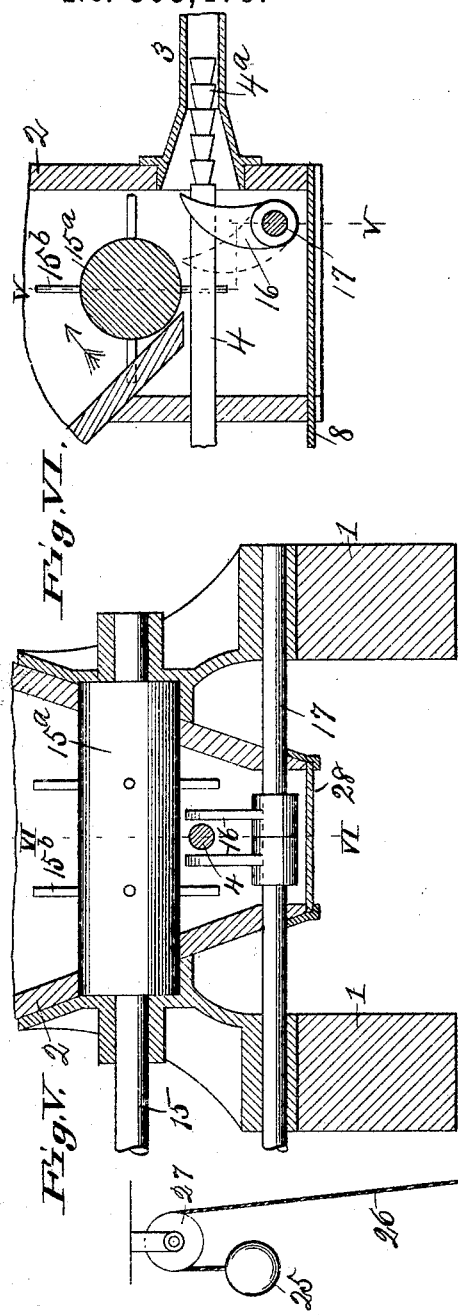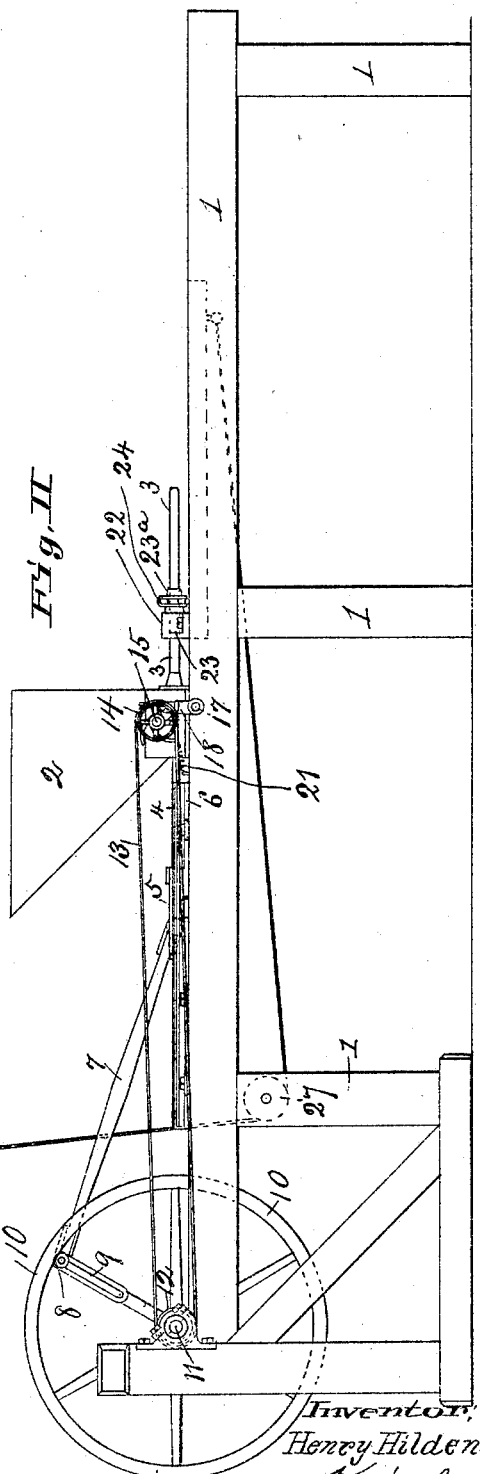

UNITED STATES PATENT OFFICE.

HENRY HILDENBRAND, OF ST. LOUIS, MISSOURI.

COLLAR-STUFFING MACHINE.

SPECIFICATION forming part of Letters Patent No. 503,479, dated August 15, 1893.

Application filed April 24, 1893. Serial No. 471,587. (No model.)

*To all whom it may concern:*

Be it known that I, HENRY HILDENBRAND, a citizen of the United States, residing in the city of St. Louis, in the State of Missouri, have invented certain new and useful Improvements in Machines for Stuffing Horse-Collars, of which the following is a specification.

My invention relates to horse collar stuffing or filling machines, of the general character described in Letters Patent No. 59,726, dated November 13, 1866, and No. 72,423, dated December 17, 1867, both granted to August Schrick and myself. The machine is constructed with a hopper for the reception of the cut straw or other filling material, reciprocating and intermittent feed mechanism in said hopper, a delivery tube projecting horizontally from said hopper, a reciprocating plunger working within said delivery tube and operated by a radially adjustable crank pin and a fly wheel, a carriage on which the collar rests, having at the receiving end a funnel-shaped guide through which the feed tube projects, and over which the open end of the collar is secured by a suitable clamp. Under the former construction, the feed mechanism in the hopper was operated through the medium of a rod from an eccentric on the fly wheel shaft so as to have one movement from each revolution of said shaft; the receding motion, of the carriage as the collar is filled was resisted by friction in the ways, and the return motion of the carriage preparatory to starting a new filling operation was effected by a rack and pinion movement, operated by hand. Under my present improvement I employ a continuously rotating feeding cylinder, armed with radial pins and driven by belt and pulley, so that it may be rotated at any speed, and I employ reciprocating packing fingers for forcing the material into the feed tube, operated by a cam wheel, so that they may receive four impulses more or less at each revolution. I also provide the sliding carriage with a counterbalance weight and cord connection serving to offer constant resistance to the pressure of the packing plunger, and when the collar is removed restoring the carriage automatically to its original position.

My improved machine is adapted for filling collars with short straw.

In the accompanying drawings, forming part of this specification: Figure I is a plan view of the improved machine. Fig. II is a side elevation of the same. Fig. III is a front view of the hopper and its accessories, showing the feed tube in section. Fig. IV is a side view of the same, the driving pulley being removed. Fig. V is a transverse section of the same on the line V—V, Fig. VI; the feed shaft and packing fingers being shown in elevation. Fig. VI is a longitudinal section thereof, on the line VI—VI, Fig. V.

The detail views, Figs. III, IV, V and VI are on a larger scale.

1 represents a suitable bed frame, and 2 a hopper for cut straw, mounted thereon. Communicating with the lower part of the hopper is a horizontal feed tube 3, funnel shaped at its receiving end, as shown in Fig. VI, and extending to the requisite length to conduct the cut straw into the collar. The feed of cut straw is effected by a reciprocating plunger 4, extending within the feed tube and formed as shown in Fig. VI, with a series of ratchet shaped ridges or collars $4^a$, adapted to impel the cut straw through the feed tube in the forward stroke and to pass easily through it in the return motion. The plunger 4 is attached at its rear end to a cross head 5, sliding in ways 6 in the bed frame and moved by a pitman 7, which is pivoted at one end to said cross head and at the other to a crank pin 8 mounted in a slot 9 in the fly-wheel 10, so as to be capable of radial adjustment, so that the rotation of the fly wheel will impart a longitudinal reciprocating movement to the plunger, with a stroke of any desired length. The rotation of the fly wheel shaft 11 may be effected by any usual and suitable means, either by hand or by power. I have shown, for illustration, the crank pin 8 of sufficient length for use as a hand crank. The shaft 11 also carries a pulley 12 communicating by a belt 13 with a pulley 14 on the shaft 15 of a feed cylinder $15^a$, mounted in the lower part of the hopper and armed with radial pins $15^b$, which as the cylinder $15^a$ is rotated in the direction indicated by the arrow in Fig. VI, sweep downward nearly in contact with the front of the hopper, so as to press the cut straw down in the bottom of the hopper, where it is caught by the oscillating curved fingers 16 which project upward from a transverse shaft 17 and have a stroke about as indicated by the dotted lines in Fig. VI, so as to force the cut straw into the feed tube 3 in their forward stroke, and by reason of their curved form, to pass through it in their back stroke. The oscillating motion is imparted to the shaft 17 by means of an arm 18 provided with a projecting pin or roller 19 acted on by cam arms 20 projecting from the shaft 15. The forward stroke is thus imparted to the packing fingers 16 with any necessary force several times (four in the present illustration) in each rotation of the shaft 15. The return movement of the fingers requiring comparatively little power, is imparted by a spring 21. The collar to be filled is placed on a carriage 22 upon the forward or receiving end of which is mounted a throat plate and guide 23, which slides over the fixed feed tube 3 and is formed with a nozzle 23ª over which the open end of the collar is drawn for filling and is there secured by means of a clamp 24. The carriage is held in the advanced position shown in Figs. I and II, with any necessary force, by a counterbalance weight 25 suspended from a cord 26 passing around pulleys 27 and attached to the carriage. This device offers any necessary resistance to the pressure of the plunger 4 in the filling of the collar, which may be supplemented by pressure of the hand of the operator, if desired, and at the same time permits the constant and automatic retreat of the carriage carrying the collar, as the latter is gradually filled.

28 represents a sliding bottom by means of which the hopper may be emptied, when desired.

The operation is as follows:—Short straw, say, for example, one-half to five-eighths of an inch in length being supplied to the hopper 2, is pressed down in the bottom thereof by the toothed cylinder 15ª, 15ᵇ, and by the action of the oscillating fingers 16 is pressed horizontally into the funnel mouth of the fixed feed tube 3. The reciprocating motion of the plunger 4 within the feed tube then forces the cut straw through the said tube and delivers it in impacted condition within the collar, which by the advanced position of the carriage 22 is drawn completely over the tube so that the cut straw is first packed in the throat of the collar, and so on till one side is completely filled, the carriage retreating as required. Proper manipulation by the operator during this operation assists in imparting the proper curve to the collar, the shell thereof being of course constructed in proper form for this purpose. One side of the collar being thus filled, it is released from the clamp 24 and removed from the nozzle 23ª of the throat plate, and the fresh side applied, and secured thereto. The carriage is automatically restored to its first position by the weight 25 and cord 26, and the work proceeds as before.

Having thus described my invention, what I claim as new, and desire to secure by Letters Patent, is—

1. The combination of the hopper 2, fixed feed tube 3, vertically moving feed pins 15ᵇ, horizontally reciprocating fingers 16, and reciprocating plunger 4, as and for the purpose set forth.

2. The combination with the hopper 2 and feed tube 3, of the reciprocating plunger 4, operating wheel 10, and crank and pitman connections between them for operating said plunger, and the oscillating packing fingers 16 and cam mechanism, substantially as described, for operating said fingers whereby a number of strokes are imparted to said fingers, to each complete stroke of the plunger.

3. The combination of the hopper 2, the feed-tube 3, the reciprocating packing plunger 4, the operating wheel 10, the crank and pitman connections for operating said plunger, the oscillating packing fingers 16, the cam mechanism, the sliding carriage 22, and the weight 25 and cord 26, substantially as shown and described.

HENRY HILDENBRAND.

Witnesses:
 OCTAVIUS KNIGHT,
 BENJN. A. KNIGHT.